(12) United States Patent
Reznik (10) Patent No.: US 7,292,623 B2
(45) Date of Patent: Nov. 6, 2007

(54) PARALLEL INTERFERENCE CANCELLATION RECEIVER FOR MULTIUSER DETECTION CDMA SIGNALS

(75) Inventor: Alexander Reznik, Princeton, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 693 days.

(21) Appl. No.: 10/827,481

(22) Filed: Apr. 19, 2004

(65) Prior Publication Data
US 2004/0196892 A1 Oct. 7, 2004

Related U.S. Application Data

(63) Continuation of application No. 10/127,308, filed on Apr. 22, 2002, now Pat. No. 6,724,809, which is a continuation of application No. PCT/US00/03537, filed on Feb. 11, 2000.

(60) Provisional application No. 60/160,259, filed on Oct. 19, 1999.

(51) Int. Cl.
  *H04B 1/00* (2006.01)
(52) U.S. Cl. ...................... 375/148; 375/152
(58) Field of Classification Search ................ 375/130, 375/140, 147, 143, 144, 148, 152, 316, 285, 375/346, 350; 370/335, 342, 441
See application file for complete search history.

(56) References Cited

U.S. PATENT DOCUMENTS 5,394,434 A     2/1995  Kawabe et al.
5,822,380 A    10/1998  Bottomley
6,714,527 B2 *  3/2004  Kim et al. ................... 370/335
6,724,809 B2 *  4/2004  Reznik ........................ 375/148
6,968,211 B2 * 11/2005  Miya ........................ 455/562.1
7,110,431 B2 *  9/2006  Oates ........................ 375/130

FOREIGN PATENT DOCUMENTS

EP          0767543         4/1997

OTHER PUBLICATIONS

Klein et al., "Zero Forcing And Minimum Mean-Square-Error Equalization For Multiuser Detection in Code-Division Multiple Access Channels," IEEE Transaction on Vehicular Technology, US, IEEE Inc., New York, vol. 45, No. 2, May 1, 1996.

(Continued)

*Primary Examiner*—Tesfaldet Bocure
(74) *Attorney, Agent, or Firm*—Volpe and Koenig, P.C.

(57) ABSTRACT

A plurality of communications is received. The communications are transmitted in a wireless code division multiple access format. A channel response for each received communication is estimated. A system response matrix is constructed using codes and the channel responses of the received communications. An objective matrix is produced using the system response matrix. The received communications are matched filtered to produce a first input. The first input is processed with an interference cancellation matrix to produce a first set of symbols of the received communications. The first set of produced symbols are processed with a feedback interference construction matrix to produce feedback interference. The feedback matrix added to an inverse of the interference cancellation matrix equals the objective matrix. The feedback interference is subtracted from a result of the match filtering to produce a next input. The next input is processed with the interference cancellation matrix to produce a next set symbols of the received communications.

12 Claims, 9 Drawing Sheets

OTHER PUBLICATIONS

Duel-Hallen A., "A Family of Multiuser Decision-Feedback Detectors for Asynchronous Code-Division Multiple-Access Channels," IEEE Transaction on Communications, US, IEEE Inc., New York, vol. 43, No. 2/4, Part 1, Feb. 1, 1995.

Divsalar et al., "Improved Parallel Interference Cancellation For CDMA", IEEE Transactions on Communications, vol. 46, No. 2, Feb. 1998.

* cited by examiner

PARALLEL INTERFERENCE CANCELLATION RECEIVER FOR MULTIUSER DETECTION CDMA SIGNALS

CROSS REFERENCE TO RELATED APPLICATION(S)

This application is a continuation of U.S. patent application Ser. No. 10/127,308 filed Apr. 22, 2002 now U.S. Pat. No. 6,724,809, which is a continuation of PCT/US00/03537, filed Feb. 11, 2000, which claims priority from U.S. Provisional Application No. 60/160,259, filed Oct. 19, 1999.

FIELD OF INVENTION

The present invention relates generally to multiple access digital communication systems. More specifically, the invention relates to a parallel interference cancellation receiver system and method for the simultaneous reception of data from multiple users.

A multiple-access communication system allows a plurality of users to access the same communication medium to transmit or receive information. The media may comprise, for example, a network cable in a local area network or lan, a copper wire in the classic telephone system, or an air interface for wireless communication.

DESCRIPTION OF THE RELATED ART

Figure 1:
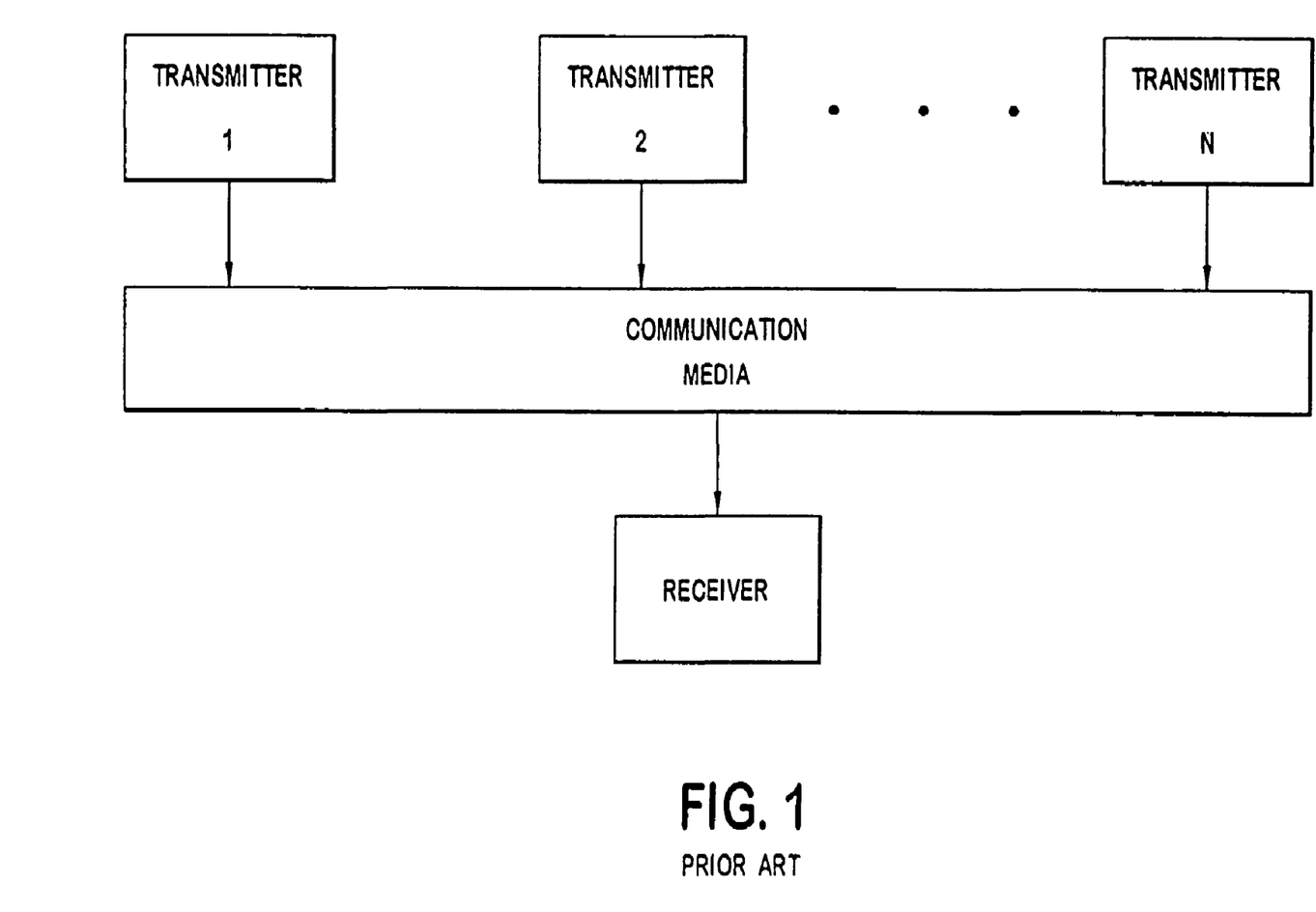
FIG. 1 is a simplified block diagram of a prior art multiple access communication system.

A prior art multiple access communication system is shown in FIG. 1. The communication media is referred to as a communication channel. Communication techniques such as frequency division multiple access or FDMA, time division multiple access or TDMA, carrier sense multiple access or CSMA, code division multiple access or CDMA and others allow access to the same communication medium for more than one user. These techniques can be mixed together creating hybrid varieties of multiple access schemes. For example, time division duplex or TDD mode of the proposed third generation W-CDMA standard is a combination of TDMA and CDMA.

Figure 2:
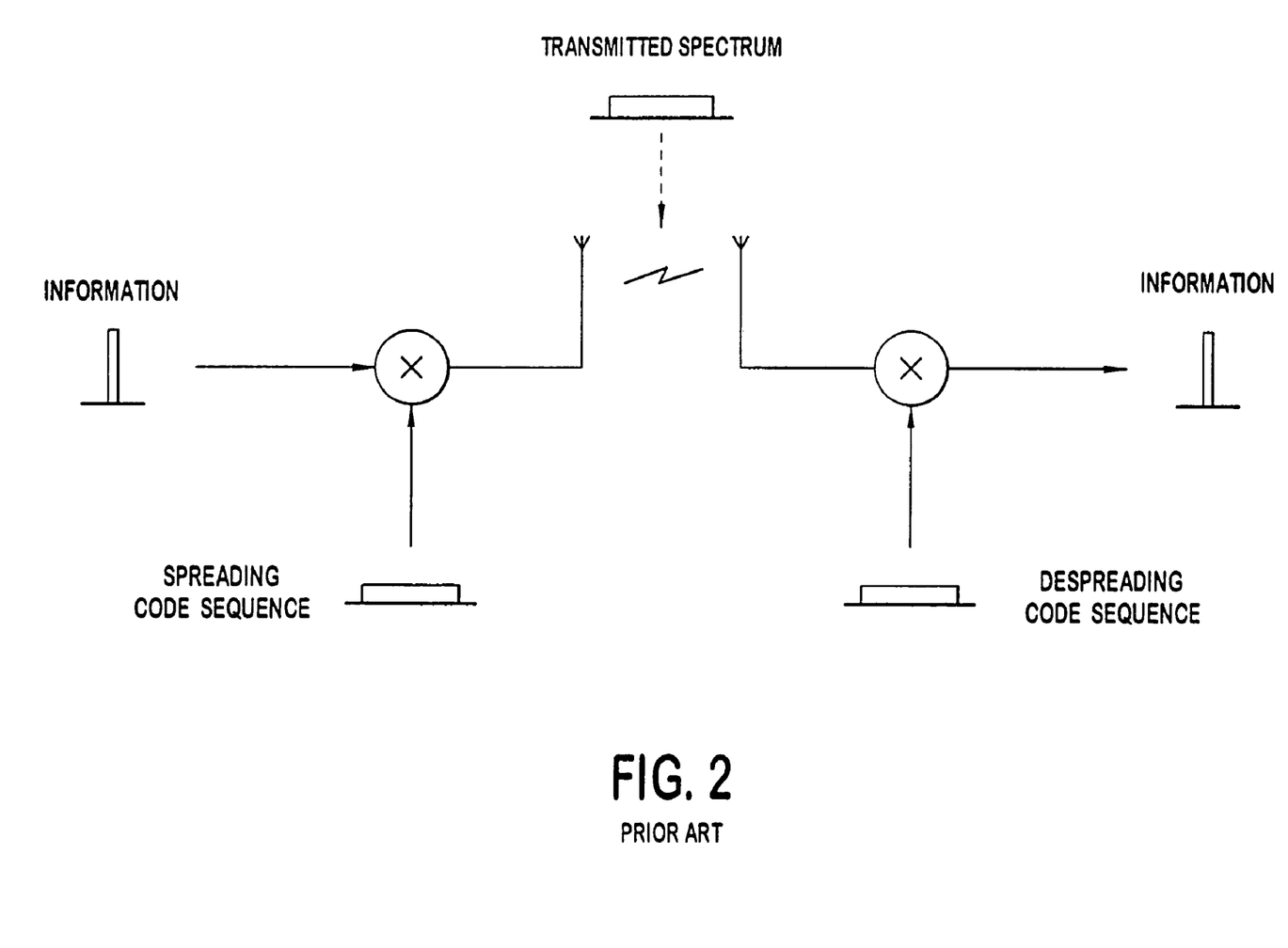
FIG. 2 is a simplified block diagram of a prior art CDMA communication system.

An example CDMA prior art communication system is shown in FIG. 2. CDMA is a communication technique in which data is transmitted with a broadened band (spread spectrum) by modulating the data to be transmitted with a pseudo-noise signal. The data signal to be transmitted may have a bandwidth of only a few thousand Hertz distributed over a frequency band that may be several million Hertz. The communication channel is being used simultaneously by K independent subchannels. For each subchannel, all other subchannels appear as interference.

As shown, a single subchannel of a given bandwidth is mixed with a unique spreading code which repeats a predetermined pattern generated by a wide bandwidth, pseudo-noise (pn) sequence generator. These unique user spreading codes are typically pseudo-orthogonal to one another such that the cross-correlation between the spreading codes is close to zero. A data signal is modulated with the pn sequence producing a digital spread spectrum signal. A carrier signal is then modulated with the digital spread spectrum signal and transmitted in dependence upon the transmission medium. A receiver demodulates the transmission extracting the digital spread spectrum signal. The transmitted data is reproduced after correlation with the matching pn sequence. When the spreading codes are orthogonal to one another, the received signal can be correlated with a particular user signal related to the particular spreading code such that only the desired user signal related to the particular spreading code is enhanced while the other signals for all other users are not enhanced.

Each value of the spreading code is known as a chip and has a chip rate that is the same or faster than the data rate. The ratio between the chip rate and the subchannel data rate is the spreading factor.

To extend the possible range of values of the data signal, a symbol is used to represent more than two binary values. Ternary and quaternary symbols take on three and four values respectively. The concept of a symbol allows for a greater degree of information since the bit content of each symbol dictates a unique pulse shape. Depending upon the number of symbols used, an equal number of unique pulse or wave shapes exist. The information at the source is converted into symbols which are modulated and transmitted through the subchannel for demodulation at the destination.

The spreading codes in a CDMA system are chosen to minimize interference between a desired subchannel and all other subchannels. Therefore, the standard approach to demodulating the desired subchannel has been to treat all other subchannels as interference, similar to interference that manifests itself in the communication medium. Receivers designed for this process are single-user, matched filter and RAKE receivers.

Since different subchannels do interfere with each other somewhat, another approach is to demodulate all subchannels at a receiver. The receiver can listen to all of the users transmitting at once by running a decoding algorithm for each of them in parallel. This ideology is known as multiuser detection. Multiuser detection can provide a significant performance improvement over single-user receivers.

Figure 3:
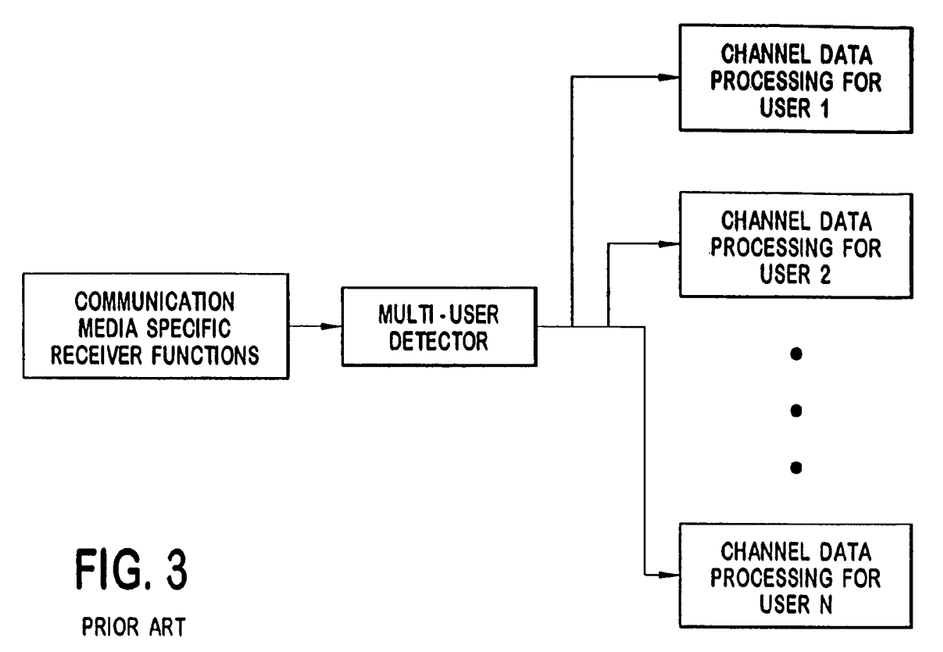
FIG. 3 is a simplified block diagram of a prior art CDMA receiver with multiuser detection.

Referring to FIG. 3, a system block diagram of a prior art CDMA receiver using a multiuser detector is shown. As one skilled in this art realizes, the receiver may include such functions as radio frequency or rf down conversion and associated filtering for radio frequency channels, analog-to-digital conversion or optical signal demodulation for a specific communication media. The output of the receiver is a processed signal, either analog or digital, containing the combined spread signals of all active subchannels. The multiuser detector performs multiuser detection and outputs a plurality of signals corresponding to each active subchannel. All or a smaller number of the total number of subchannels may be processed.

Optimal multiuser detectors are computationally intensive devices performing numerous complex mathematic operations and are therefore difficult to implement economically. To minimize expense, suboptimal multiuser detectors such as linear detectors and parallel interference cancellation or PIC receivers have been developed requiring less computational complexity as a compromise approximating the performance of optimal detectors. Linear detectors include decorrelators, minimum mean square error or MMSE detectors, zero-forcing block linear equalizers or ZF-BLEs and the like. PIC receivers are usually designed as multistage iterative receivers and are soft-decision (SD) or hard-decision (HD) based.

Figure 4:
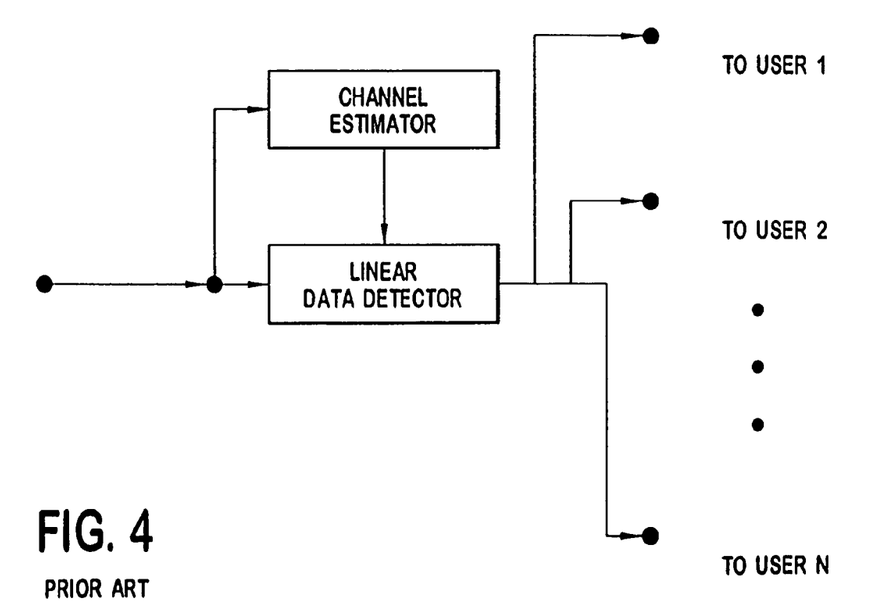
FIG. 4 is a simplified block diagram of a prior art multiuser detector.

A system block diagram of a prior art linear multiuser detector for synchronous or asynchronous CDMA communication is shown in FIG. 4. Data output from the communication media specific receiver (as in FIG. 3) is coupled to a subchannel estimator which estimates the impulse response of each symbol transmitted in a respective subchannel. The linear detector uses the impulse response estimates along with a subchannel's spreading code to demodulate each subchannel's data. The data is output to subchannel data processing blocks for respective users.

To effect parallel detection of K subchannel users in a physical system, linear multiuser detector methods are executed as fixed gate arrays, microprocessors, digital signal processors or DSPs and the like. Fixed logic systems allow for greater system speed while microprocessor driven systems offer programming flexibility. Either implementation that is responsible for the multiuser detection performs a sequence of mathematic operations. To describe the functions, the following variables typically define the structure and operation of a linear multiuser detector:

K=the total number of users/transmitters that are active in the system.

$N_c$=the number of chips in a data block. The number of chips is required since with varying spreading factors this number is a measure common to all users. For the case of synchronous CDMA, a symbol from the user with the largest spreading factor may constitute a block of data. Therefore, $N_c$ can be reduced to be equal to the largest spreading factor.

W=the communication channel impulse response length in chips. This is generally a predefined parameter of the system.

$Q^{(k)}$=the spreading factor of user k. The spreading factor is equal to the number of chips that are used to spread a symbol of user's data. A system knows the spreading factors in advance and does not need to estimate them from the received data.

$N_s^{(k)}$=the number of symbols sent by user k. $N_s^{(k)}=N_c/Q^{(k)}$.

$$N_s^T = \sum_{k=1}^{K} N_s^{(k)} = \text{the total number of symbols sent.}$$

$d^{(k)}$=the data (information) sent by user k. The data is presented in the form of a vector, where a vector is an array of data indexed by a single index variable. For the purposes of vector and matrix operations which follow, all vectors are defined as column vectors. The $n^{th}$ element of $d^{(k)}$ is the $n^{th}$ symbol transmitted by the $k^{th}$ user.

$h^{(k)}$=the impulse response of the subchannel experienced by user k presented as a vector. This quantity needs to be estimated at the receiver. The receiver's estimates of the subchannel impulse responses are referred to as $h^{(k)}$. The elements of the vector $h^{(k)}$ are typically complex numbers, which model both amplitude and phase variations that can be introduced by the subchannel.

$v^{(k)}$=the spreading code of user k, presented as a vector. For the purposes of linear multiuser detection, it is useful to think of vectors containing the section of the spreading code which spreads a particular symbol. Therefore, the vector $v^{(k,n)}$ is defined as the spreading code which is used to spread the $n^{th}$ symbol sent by the $k^{th}$ user. Mathematically, it is defined as: $v_i^{(k,n)}=v_i^{(k)}$ for $(n-1)Q^{(k)}+1 \leq i \leq nQ^{(k)}$ and 0 for all other i, where i is the index of vector elements.

$r^{(k)}$=a vector which represents user k's data, spread by the spreading sequence $v^{(k)}$ and transmitted through that user's subchannel $h^{(k)}$. The vector $r^{(k)}$ represents channel observations performed during the period of time when a block of data arrives. The $i^{th}$ element of the vector $r^{(k)}$ can be defined as:

$$r_i^{(k)} = \sum_{n=1}^{N_s^{(k)}} d_n^{(k)} \sum_{j=1}^{W} h_j^{(k)} v_{i-j+1}^{(k,n)}.$$ Equation 1

The signal received at the receiver includes all user signals $r^{(k)}$ plus noise. Therefore, we can define the received data vector r as follows:

$$r = \sum_{k=1}^{K} r^{(k)} + n.$$ Equation 2

The vector n in Equation 2 represents noise introduced by the communication channel.

Figure 5:
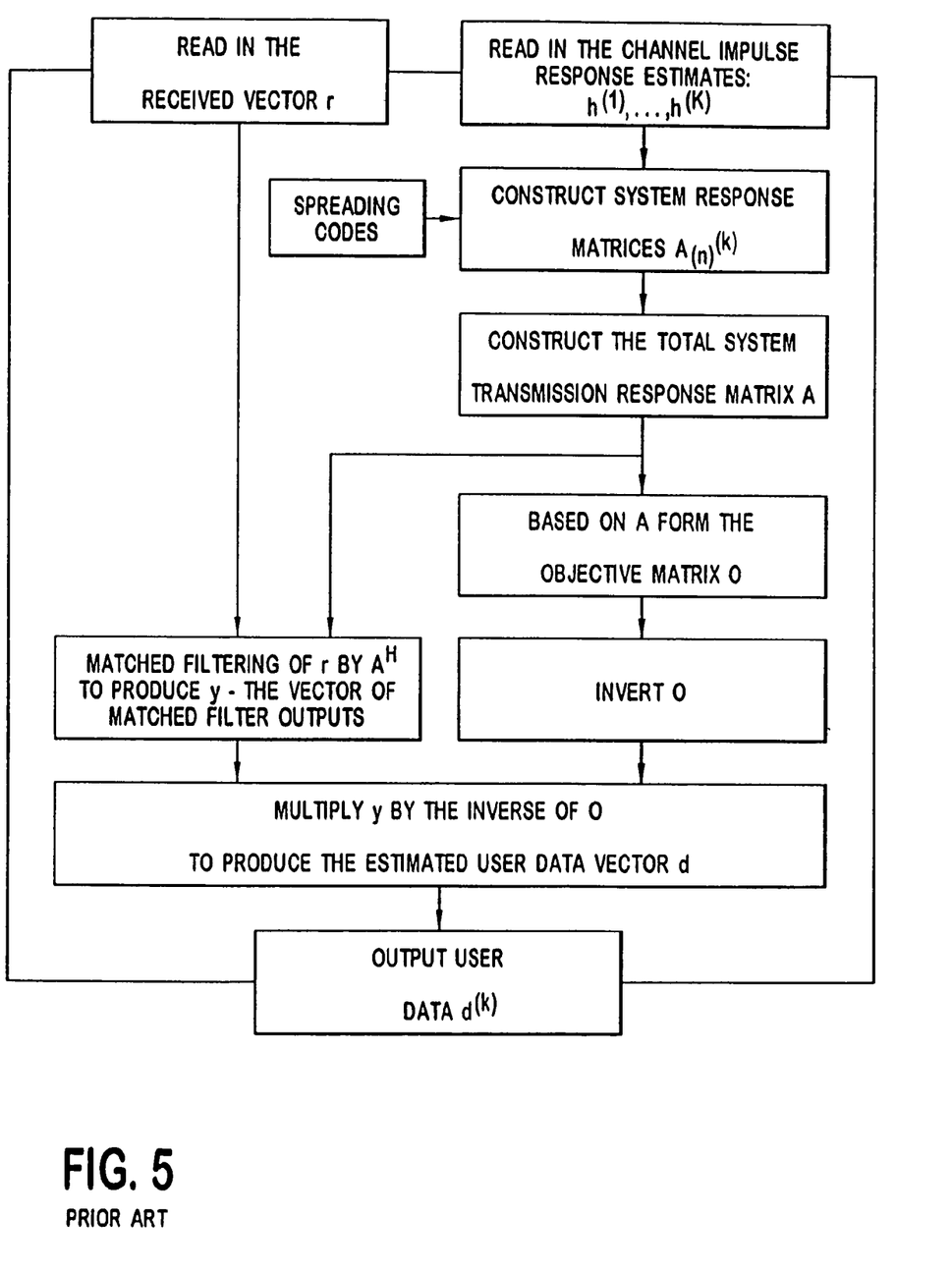
FIG. 5 is a block diagram of a prior art linear multiuser detector.

FIG. 5 shows a system and method of a prior art linear multiuser detector. The estimated subchannel impulse response vectors $h^{(k)}$ and the spreading codes $v^{(k)}$ are used to create a system transmission response matrix for each user k. A matrix is a block of numbers indexed by two indexing variables. The matrix is arranged in a rectangular grid, with the first indexing variable being a row index and the second indexing variable being a column index.

A system transmission response matrix for user k is typically denoted as $A^{(k)}$. The $i^{th}$-row, $n^{th}$-column element is denoted as $A_{i,n}^{(k)}$ and is defined as:

$$A_{i,n}^{(k)} = \sum_{j=1}^{W} h_j^{(k)} v_{i-j+1}^{(k,n)}.$$ Equation 3

Each column of the matrix $A^{(k)}$ corresponds to a matched filter response for a particular symbol sent by user k during the period of interest. Referring back to FIG. 5, the received data r is matched to a combination of all user's spreading codes and subchannel impulse responses. Therefore, $A^{(k)}$ contains $N_s^{(k)}$ matched filter responses. The columns of $A^{(k)}$ are of the form $$A_n^{(k)} = \begin{bmatrix} 0 \\ \vdots \\ 0 \\ b_n^{(k)} \\ 0 \\ \vdots \\ 0 \end{bmatrix}$$ Equation 4 where each vector $b_n^{(k)}$ has a dimension of $Q^{(k)}$+W-1, Equation 5 and is offset from the top of the matrix $A_n^{(k)}$ by $Q^{(k)}(n-1)$. Equation 6

Since the spreading codes are not periodic over symbol times; $b_i^{(k)} \neq b_j^{(k)}$ for $i \neq j$. The elements of a vector which may be non-zero values are referred to as the support of the vector. Therefore, $b_n^{(k)}$ is the support of $A_n^{(k)}$.

Once a system transmission matrix for each user is created, a total system transmission response matrix, denoted as A is created by concatenating the system transmission matrices for all the users as shown below:

$A=[A^{(1)}, \ldots, A^{(k)}, \ldots, A^{(K)}].$ Equation 7

In accordance with prior art modulation techniques, the elements of $h^{(k)}$ can be complex numbers. It then follows that the non-zero elements of A can be complex numbers.

An example total system transmission response matrix A for a prior art multiuser detector assembled in accordance with Equations 4, 5, 6 and 7 is $$A = \begin{bmatrix} b_{1,1}^{(1)} & 0 & 0 & 0 & 0 & 0 & 0 & 0 & b_{1,1}^{(2)} & 0 & 0 & 0 \\ b_{1,2}^{(1)} & 0 & 0 & 0 & 0 & 0 & 0 & 0 & b_{1,2}^{(2)} & 0 & 0 & 0 \\ b_{1,3}^{(1)} & b_{2,1}^{(1)} & 0 & 0 & 0 & 0 & 0 & 0 & b_{1,3}^{(2)} & 0 & 0 & 0 \\ b_{1,4}^{(1)} & b_{2,2}^{(1)} & 0 & 0 & 0 & 0 & 0 & 0 & b_{1,4}^{(2)} & 0 & 0 & 0 \\ b_{1,5}^{(1)} & b_{2,3}^{(1)} & b_{3,1}^{(1)} & 0 & 0 & 0 & 0 & 0 & b_{1,5}^{(2)} & b_{2,1}^{(2)} & 0 & 0 \\ 0 & b_{2,4}^{(1)} & b_{3,2}^{(1)} & 0 & 0 & 0 & 0 & 0 & b_{1,6}^{(2)} & b_{2,2}^{(2)} & 0 & 0 \\ 0 & b_{2,5}^{(1)} & b_{3,3}^{(1)} & b_{4,1}^{(1)} & 0 & 0 & 0 & 0 & b_{1,7}^{(2)} & b_{2,3}^{(2)} & 0 & 0 \\ 0 & 0 & b_{3,4}^{(1)} & b_{4,2}^{(1)} & 0 & 0 & 0 & 0 & 0 & b_{2,4}^{(2)} & 0 & 0 \\ 0 & 0 & b_{3,5}^{(1)} & b_{4,3}^{(1)} & b_{5,1}^{(1)} & 0 & 0 & 0 & 0 & b_{2,5}^{(2)} & b_{3,1}^{(2)} & 0 \\ 0 & 0 & 0 & b_{4,4}^{(1)} & b_{5,2}^{(1)} & 0 & 0 & 0 & 0 & b_{2,6}^{(2)} & b_{3,2}^{(2)} & 0 \\ 0 & 0 & 0 & b_{4,5}^{(1)} & b_{5,3}^{(1)} & b_{6,1}^{(1)} & 0 & 0 & 0 & b_{2,7}^{(2)} & b_{3,3}^{(2)} & 0 \\ 0 & 0 & 0 & 0 & b_{5,4}^{(1)} & b_{6,2}^{(1)} & 0 & 0 & 0 & 0 & b_{3,4}^{(2)} & 0 \\ 0 & 0 & 0 & 0 & b_{5,5}^{(1)} & b_{6,3}^{(1)} & b_{7,1}^{(1)} & 0 & 0 & 0 & b_{3,5}^{(2)} & b_{4,1}^{(2)} \\ 0 & 0 & 0 & 0 & 0 & b_{6,4}^{(1)} & b_{7,2}^{(1)} & 0 & 0 & 0 & b_{3,6}^{(2)} & b_{4,2}^{(2)} \\ 0 & 0 & 0 & 0 & 0 & b_{6,5}^{(1)} & b_{7,3}^{(1)} & b_{8,1}^{(1)} & 0 & 0 & b_{3,7}^{(2)} & b_{4,3}^{(2)} \\ 0 & 0 & 0 & 0 & 0 & 0 & b_{7,4}^{(1)} & b_{8,2}^{(1)} & 0 & 0 & 0 & b_{4,4}^{(2)} \\ 0 & 0 & 0 & 0 & 0 & 0 & b_{7,5}^{(1)} & b_{8,3}^{(1)} & 0 & 0 & 0 & b_{4,5}^{(2)} \\ 0 & 0 & 0 & 0 & 0 & 0 & 0 & b_{8,4}^{(1)} & 0 & 0 & 0 & b_{4,6}^{(2)} \\ 0 & 0 & 0 & 0 & 0 & 0 & 0 & b_{8,5}^{(1)} & 0 & 0 & 0 & b_{4,7}^{(2)} \\ \underbrace{\phantom{xxxxxxxxxxxxxxxxxxxxxxxx}}_{A^{(1)}} & & & & & & & & \underbrace{\phantom{xxxxxxxxxxxxx}}_{A^{(2)}} & & & \end{bmatrix}$$

Equation 8 for two users (k=2), having sixteen chips in a data block ($N_c$=16), a channel impulse response length of four (W=4) and a spreading factor for the first user of two ($Q^{(1)}$=2) and a spreading factor for the second user of four ($Q^{(2)}$=4). In the resultant total system transmission response matrix A, $b_{n,i}^{(k)}$ denotes the $i^{th}$ element of the combined system and channel response for the $n^{th}$ symbol of the $k^{th}$ user.

The received data r is processed using the total system transmission response matrix A which represents a bank of matched filter responses to create a vector of matched-filter outputs which is denoted as y. The matched filtering operation is defined as $$y = A^H r. \qquad \text{Equation 9}$$

The matrix $A^H$ represents the Hermitian (or complex) transpose of the matrix A. The Hermitian transpose is defined as $A_{ij}^H = \overline{A}_{ji}$ where the over-bar denotes the operation of taking a conjugate of a complex number. The matched filter outputs are then multiplied by the inverse of an objective matrix O. The objective matrix O represents the processing which differentiates each type of linear receiver. It is derived from the system transmission matrix A.

The zero-forcing block linear equalizer (ZF-BLE) receiver is a linear receiver with an objective matrix specified as $O = A^H A$. The minimum mean square error block linear equalizer (MMSE-BLE) receiver is a linear receiver with an objective matrix specified as $O = A^H A + \sigma^2 I$ where $\sigma^2$ is the variance of the noise present on each of the symbols of the received data vector r and the matrix I is known as an identity matrix. An identity matrix is square and symmetric with 1's on its main diagonal and zeros everywhere else. The size of the identity matrix is chosen so as to make the addition operation valid according to the rules of linear algebra.

For a decorrelator (decorrelating receiver), matrix A is simplified by ignoring the channel responses $h^{(k)}$, considering only the spreading codes and their cross-correlation (interference) properties. A cross-correlation matrix, commonly referred to as R, is generally constructed for decorrelator type receivers. This matrix can be constructed by assuming that W=1 and $h_i^{(k)}$=1 in the definition of A above (i.e. the channel response of every subchannel is an impulse). Then the cross correlation matrix R is the objective matrix O as defined for the ZF-BLE receiver. A decorrelator often serves as a sub-process of a more complex multiuser detection receiver. Once the objective matrix is created, the multiuser detector will invert the matrix, denoted as $O^{-1}$.

The inverse of the objective matrix is then multiplied by the matched filter output vector y to produce estimates of the data vector d where $d(\text{estimate}) = O^{-1} y$. The inversion of the objective matrix O is a complex, computationally intensive process. The number of operations required to perform this process increases as the cube of the size of the matrix O. For most asynchronous CDMA receivers, the size of O is very large which makes the process of inversion impracticable. Techniques using linear algebra reduce the complexity of taking the inverse of the objective matrix. However, these techniques may be impracticable for some applications.

Figure 6:
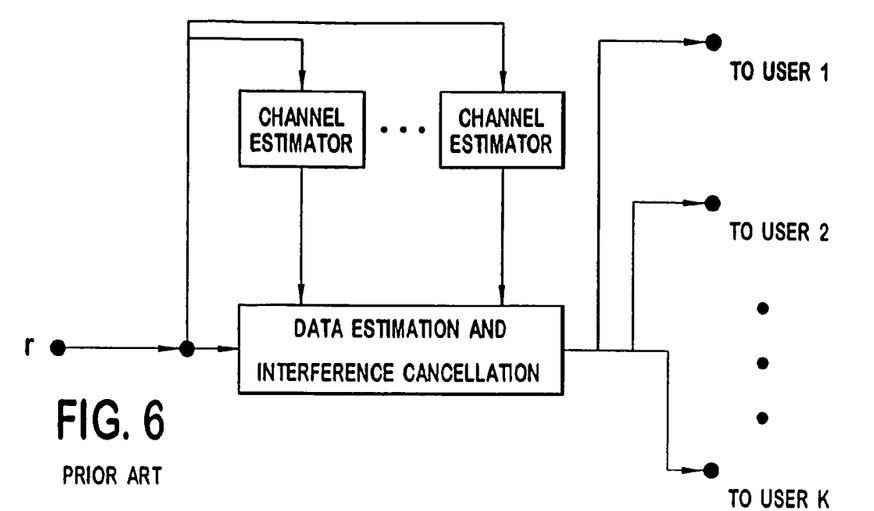
FIG. 6 is a system block diagram of a prior art PIC receiver.

Unlike linear receivers, PIC receivers do not invert the objective matrix O. Therefore, PIC receivers offer an alternative that is less complex than linear multiuser detectors. FIG. 6 shows a typical prior-art PIC receiver. The received data vector r is input to a plurality of channel estimators which independently estimate each user's subchannel impulse response. The subchannel impulse responses are output to a data estimation and interference cancellation processor which estimates the received data for all users in parallel. The estimated received data is output to subchannel data processing blocks for further processing.

Figure 7:
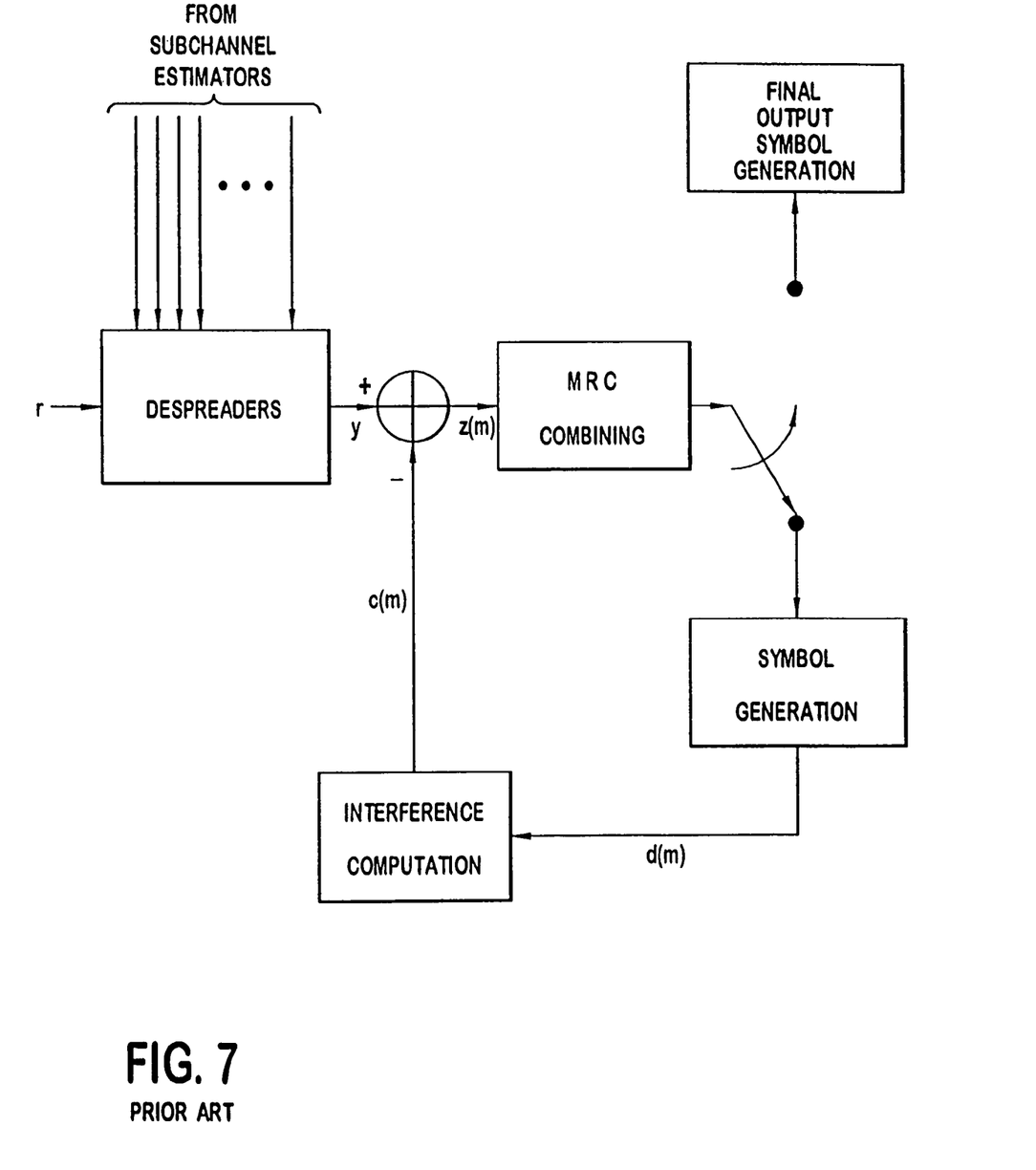
FIG. 7 is a system block diagram of a prior art PIC data estimation and interference cancellation processor.

Shown in FIG. 7 is the prior art data estimation and interference cancellation process used in PIC receivers. The PIC receiver presumes that each subchannel consists of L distinct signal paths from a given user's transmitter to a receiver due to the transmission media. For each path L, the relative delays, amplitudes and phases are estimated at the receiver by the subchannel estimation processors shown in FIG. 6. For each of the L distinct paths of each user K present in the system, the PIC receiver allocates a despreader matched to the specific code of a respective user and the specific time delay of each path. Therefore, a total of KL despreaders are allocated in the despreader bank. Each despreader produces estimates of the received data from its respective user. The L data estimates for different paths of the same user's subchannel are combined to produce a complete data estimate of the transmitted user's data. As shown in FIG. 7, the common prior art combining method is maximal ratio combining or MRC. Other combining methodologies exist in the prior art and can be used. The combined data estimates are output to a symbol generation processor which generates estimated symbol information which is output to the interference cancellation processor.

The spreading codes for each user K and the relative delays between the KL paths are known by the interference cancellation processor. The information is used to produce estimates of the interference that each user's received path (i.e., 1, 2, 3 ... L) contributes to another user's L signal paths and to the signals received on L−1 signal paths of the same user. The interference estimates are subtracted from the despreader outputs which are again passed to the combining processor to produce revised data estimates. The revised data estimates are again used to generate revised interference estimates which are used to produce another set of revised data estimates. In theory, the process can be repeated indefinitely. However, in practice, the process terminates after two or three iterations.

The distinction between an SD-PIC and an HD-PIC lies in the symbol generation process. For the SD-PIC, the symbol generation process generates confidence information about the decisions made on the received symbols, for the HD-PIC, the symbol generation circuit does not generate confidence information for the received symbols. The difference refers only to the internal processing of the data estimation unit of the receiver. Both types of PIC receivers are capable of producing soft and hard decision symbol estimates for further processing by the dedicated subchannel data processors shown in FIG. 6. This is shown in FIG. 7 by placing a final output data symbol generator for generating the final receiver output and may be different from the internal data symbol generation circuit.

An inherent problem with prior art PIC receivers resides in the received signal model that is used. Prior art PIC receivers assume that each subchannel consists of L discrete paths that the transmitted signal undergoes in the transmission media. The separation of the despreading and channel matching (performed by the combining processor) operations is the result of this assumption. However, a receiver constructed with this assumption can only correct for interference resulting from non-orthogonalities in the spreading sequences, more commonly known as multiple access interference or MAI. It cannot correct for interferences between one user's various symbols due to the time spreading of these symbols during transmission in the communication channel. This form of signal corruption is more commonly known as inter-symbol interference or ISI. ISI contributes to a phenomenon referred to as "the fat finger effect."

The fat finger effect occurs when two paths from the same user have such a small relative time delay that the delay cannot be resolved by the receiver as two distinct paths. The receiver fails to estimate the data from either of the two paths thereby affecting all users resulting in poor receiver performance.

Since all prior art PIC receivers use the simplifying assumption of L paths to separate the despreading and the channel combining operations, a PIC receiver using the accurate received signal model of a linear multiuser detector is desired.

SUMMARY OF THE INVENTION

A parallel interference cancellation receiver system and method is presented that reduces impulse response interference using a model of the received signal similar to that used in block linear equalizers. Block linear equalizers comprise decorrelating receivers, zero-forcing receivers, minimum mean square error receivers and the like. The invention comprises an interference computation processor feedback loop for correcting the output of a direct interference canceller. The m iterative process removes interferers from the output symbols of a matched-filter. The PIC receiver uses received signal models of the various block linear equalizers that do not assume that each subchannel consists of several distinct paths. The receiver estimates the impulse response characteristic of each subchannel as a whole.

Accordingly, it is an object of the present invention to provide a system and method of receiving and decoding a plurality of signals over a CDMA interface.

It is another object of the present invention to provide a PIC receiver system and method having greater accuracy with less required computations.

Other objects and advantages of the system and method will become apparent to those skilled in the art after reading a detailed description of the preferred embodiment.

DETAILED DESCRIPTION OF THE INVENTION

The embodiments will be described with reference to the drawing figures where like numerals represent like elements throughout.

Figure 8:
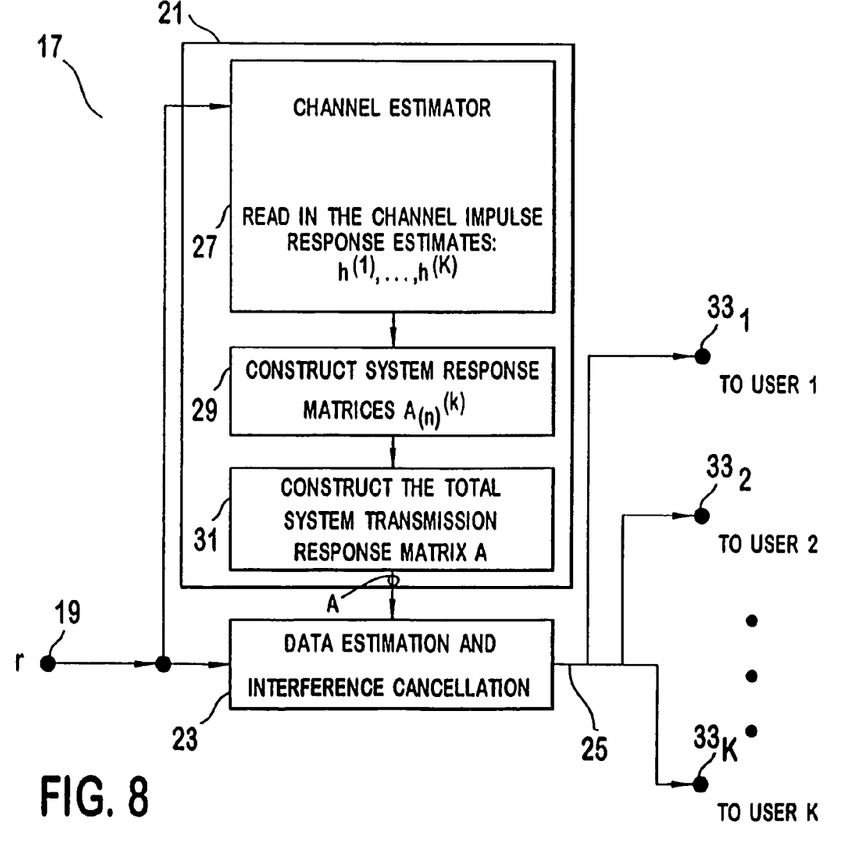
FIG. 8 is a system block diagram of a PIC receiver of the present invention.

Shown in FIG. 8 is a parallel interference cancellation receiver 17 of the present invention for detecting, after reception, a plurality of users transmitting over a common CDMA channel. The receiver 17 comprises an input 19 for inputting data from all users k transmitted in a discreet block of time in the form of an input vector r containing the combined data from each user's subchannel, a channel estimation processor 21 for deriving individual impulse response estimates $h^{(k)}$ for each user and assembling a total system response matrix A, a data estimation and interference canceller 23 for generating interference free user data $d^{(k)}$ and an output 25 for outputting user data $d^{(k)}$ for each user k from the received channel data r in the form of an output vector. The parallel interference canceller 17 comprises a plurality of processors having collateral memory which perform various vector and matrix operations. Alternate embodiments may implement the invention 17 using fixed gate arrays and DSPs performing the functions of the various processors. The total number of users K and the spreading factor $Q^{(k)}$ for each user (k=1, 2, 3 . . . K) are known a priori by a teaching transmission or by pre-loading into the PIC receiver 17.

After demodulation, the received signal r is input 19 to the channel estimator processor 21 where individual k subchannel impulse response estimates are modeled 27 as vectors $h^{(k)}$ to correct inter-symbol interference or ISI caused by a subchannel's own symbols and MAI caused by symbols from other user's subchannels for all received data signals. The individual k subchannel impulse response estimates $h^{(k)}$ are input to a first memory 29 where it is combined with the same user's spreading code (Equation 3) creating a system transmission response estimate matrix $A_n^{(k)}$ for that user. Each system transmission response estimate matrix $A_n^{(k)}$ is output to a second memory 31 where a total system transmission response matrix A is assembled. The total system transmission response matrix A is comprised of all system transmission impulse response estimate matrices $A_n^{(k)}$ (Equation 7). The total system transmission response matrix A contains joint information about all of the subchannels in use by the active transmitters and contains information about any possible cross-channel and inter-symbol interference present in the received data signal r.

The total system transmission response matrix A is output to the data detection and interference canceller 23 which performs an estimation of transmitted data based on the received data vector r. The data detection processor 23 estimates subchannel data symbols and outputs a received data vector $d^{(k)}$ to per-subchannel processing units $33_1$, $33_2$, $33_3$, . . . $33_K$ such as interleavers, Viterbi decoders, and the like.

Figure 9:
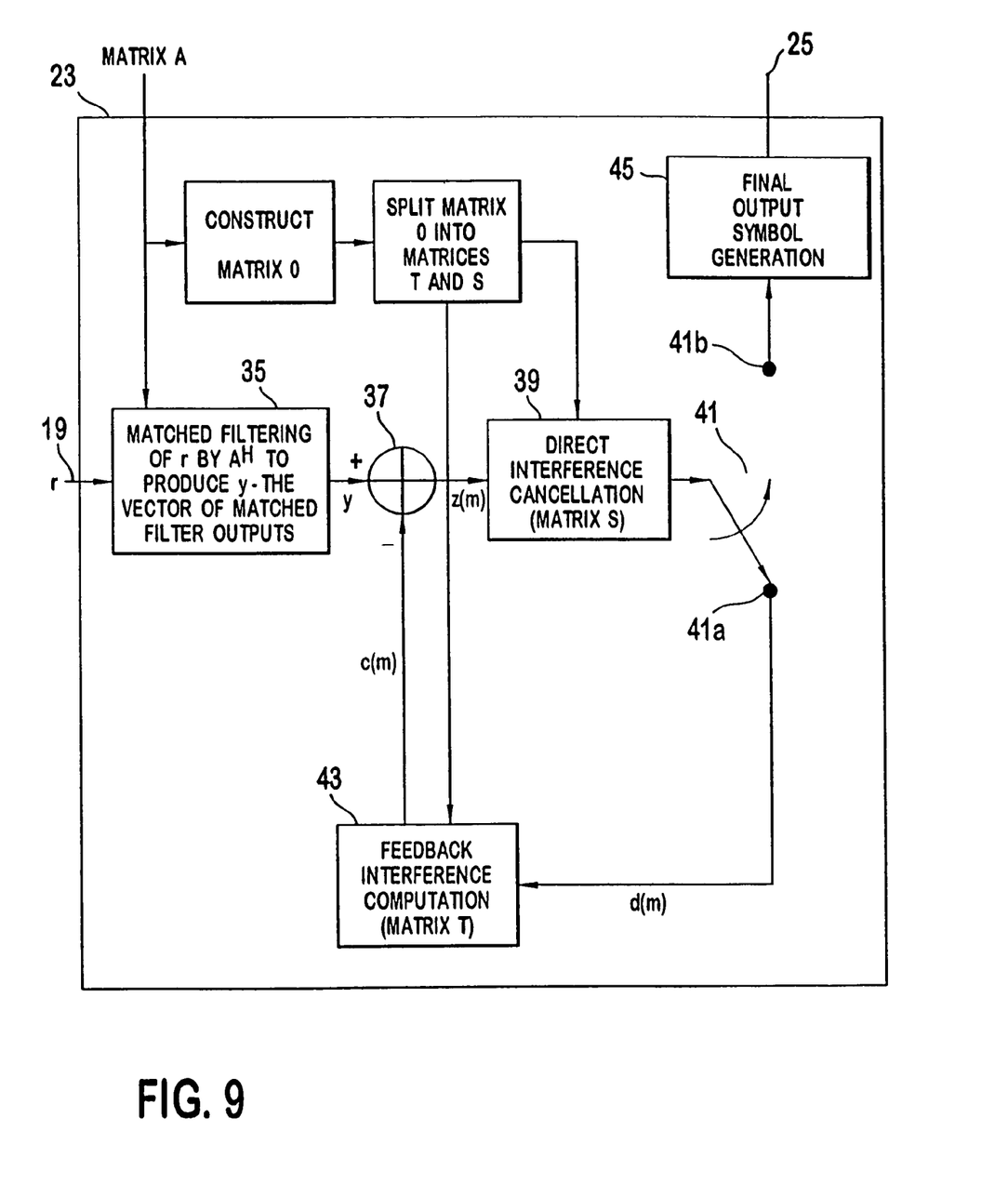
FIG. 9 is a system block diagram of a linear soft-decision PIC receiver of the present invention.

The data estimation and interference canceller 23 is shown in FIG. 9. The data detection processor 23 is comprised of a matched-filter 35 which match-filters the input 19 data vector r producing a vector of matched-filter outputs y, an adder 37 for removing feedback interference c from the matched-filter 35 output y, a direct interference canceller 38 for deriving estimates of the user data $d^{(k)}$, an iteration counter/switch 41, a feedback interference processor 43 and a symbol generator 45 for assembling symbols from the estimated user data $d^{(k)}$.

To obtain user data $d^{(k)}$ for a specific user from the combined user data r, the user data r must be filtered using a matched-filter 35 or the like. One knowledgeable in this art recognizes that a matched-filter 35 requires a response characteristic whose elements are complex conjugates of the combination of the spread pulse shape and the user's subchannel impulse response to produce an output with a level representative of the signal prior to transmission. Signals r input 19 to the filter 35 which do not match with a given response characteristic produce a lower output.

The matched-filter 35 is similar to the matched-filtering operations performed by linear multiuser receivers. The matched-filter 35 operation is described by Equation 9 unlike the despreading operation of prior art parallel interference cancellation receivers. The input user data r is matched to the spreading code $v^{(k)}$ and the subchannel impulse response $h^{(k)}$ for each particular subchannel k. Each element of the matched-filter 35 output vector y is a first rough estimate of the corresponding symbol in the transmitted data vector d.

The total system transmission response matrix A provides the response characteristics to the matched-filter 35. Each column of the system response matrix A is a vector which represents the response characteristics of a particular symbol. The received data vector r is input to the matched-filter 35 where it is matched with every response characteristic from the total system transmission response matrix A to produce the matched-filter output vector y. Each element of output vector y corresponds to a preliminary estimate of a particular symbol transmitted by a given user.

The matched-filter 35 output vector y is input to the direct interference canceller 39. The direct interference canceller 39 performs a partial interference cancellation operation on the matched-filter 35 output vector y. The operation may be a scaling operation or a more complex operation. The partial interference canceled vector y is output as data symbol estimates d and is input to the feedback interference processor 43 through an iteration/counter switch 41a.

The feedback interference processor 43 uses the direct interference canceller 39 output estimates d to arrive at interference estimates output as a vector c that were not previously canceled by the direct interference canceller 39. The interference estimates c are subtracted from the matched-filter 35 output vector y. The result z is the matched-filter 35 output vector y less the subtracted interference estimates c. The iterative interference subtraction process may be repeated m times depending upon the degree of desired signal correction. After m iterations, the interferers are removed from the matched-filter 35 output y and the iteration/counter switch 41 is thrown 41b outputting d for final output symbol generation 45.

The operation of the direct interference canceller 39/feedback interference processor 43 negative feedback control loop shown in FIG. 9 represents an m iteration receiver. For example, if m=2, the PIC receiver 17 has repeated the cancellation process twice. With c(m) as the interference vector output by the feedback interference processor 43 and d(m) as the symbol estimates vector output by the direct interference canceller 39, for the $m^{th}$ iteration, $$\vec{d}(m) = S(\vec{y} - \vec{c}(m)) \text{ and} \qquad \text{Equation 10}$$

$$\vec{c}(m) = T\vec{d}(m-1) \qquad \text{Equation 11}$$

where the direct interference canceller 39 performs a multiplication of the matched filter output vector y by a matrix S and the feedback interference processor 43 performs a multiplication of the symbol estimates d by a matrix T. The initial condition of d(m) is 0. One skilled in this art recognizes that other initial conditions can be chosen without significantly affecting the operation of the system.

The output of the direct interference canceller 39 is the vector d(m) after the last iteration m. As in prior art parallel interference cancellation receivers, this output is processed by the final output symbol generator 45 which produces hard or soft-decision information on the output symbol estimates depending on the system requirements.

Depending upon the number of iterations m performed by the present invention 17, the output of the data estimation and interference canceller d(m) can be written as $$\vec{d}(m) = (ST+I)^{-1} S \vec{y} + (-1)^m (ST)^{m+1} (ST+I)^{-1} S \vec{y} \quad \text{Equation 12}$$

where the steady-state response is, $$\vec{d}_{ss} = (ST+I)^{-1} S \vec{y} \quad \text{Equation 13}$$

and the transient response is, $$\vec{d}_t(m) = (-1)^m (ST)^{m+1} (ST+I)^{-1} S \vec{y}. \quad \text{Equation 14}$$

The PIC receiver 17 converges to the steady-state response if the transient response approaches zero as the number of iterations increase. When this occurs, the receiver 17 converges to the steady-state response given in Equation 13 as explained in the technical paper by A. Reznik entitled, *A new class of PIC multiuser receivers and their relationship to ZF-BLE and MMSE-BLE multiuser receivers*, internal InterDigital Communications Corporation presentation, Oct. 19, 1999, the disclosure thereof incorporated by reference.

The steady-state response of prior art linear receivers such as ZF-BLE, MMSE-BLE and others and decorrelators is defined as $$\vec{d} = O^{-1} \vec{y} \quad \text{Equation 15}$$

where O is the objective matrix.

Referring back to Equations 13 and 15; if matrices S and T are selected such that $(ST+I)^{-1}S = O^{-1}$ and if the receiver 17 defined by Equations 10 and 11 converges, it will converge to the linear receiver defined by the objective matrix O. Linear algebra requires that in order to have $(ST+I)^{-1}S = O^{-1}$, matrices S, T, and O must satisfy the following identity:

$$O = T + S^{-1}. \quad \text{Equation 16}$$

Rather than having to invert the objective matrix O, Equation 16 splits objective matrix O into two discrete matrices, T and $S^{-1}$. Matrix T defines the feedback interference processor 43. Matrix S (the inverse of matrix $S^{-1}$) defines the direct interference canceller 39. The present invention 17 replaces the inversion of matrix O with an inversion of another matrix ($S^{-1}$) and a series of matrix multiplications in the feedback loop.

An advantage of the present invention 17 lies in the fact that matrix $S^{-1}$ requires significantly less complexity to invert than the original objective matrix O. For example, matrix $S^{-1}$ may be a diagonal matrix (a matrix with non-zero entries only on the main diagonal). The inversion of a diagonal matrix only involves the inversion of each individual element lying on the main diagonal.

Furthermore, to improve the performance of the PIC 17, the main diagonal of the matrix T should contain all zeros. This is shown and described in the above referenced article authored by A. Reznik.

Combining the two formulations of matrices T and S with Equation 16, a specific form for a general PIC receiver is created. Given a linear receiver with an objective matrix O, matrix S is defined as $$S^{-1} = \text{diag}(O) \quad \text{Equation 17}$$

where diag(X) defines a matrix where the main diagonal entries are equal to the main diagonal entries of X and all other elements of the matrix are equal to zero. Using Equation 16 and solving for matrix T yields $$T = O - S^{-1}. \quad \text{Equation 18}$$

Since the direct interference canceller 39 performs the multiplication of z(m) by matrix S (which is the inverse of diag(O)), the canceller 39 performs a scaling of each individual element of the vector z(m). The matrix multiplication of d(m) with matrix T performed in the feedback interference processor 43 computes the interference components. A receiver containing this architecture is referred to as a parallel interference cancellation receiver with full interference cancellation in the feedback or a PIC-fI receiver.

For a system that requires a zero-forcing mechanism, the receiver must converge to the ZF-BLE linear receiver. The ZF-PIC-fI of the present invention 17 uses the ZF-BLE objective matrix $O = A^H A$. Therefore, matrices S and T are defined as $$S^{-1} = \text{diag}(A^H A) \text{ and} \quad \text{Equation 19}$$

$$T = A^H A - \text{diag}(A^H A). \quad \text{Equation 20}$$

For a system that requires a minimum mean square error reception mechanism, the receiver must converge to the MMSE-BLE linear receiver. The MMSE-PIC-fI receiver of the present invention 17 uses the MMSE-BLE objective matrix $O = A^H A + \sigma^2 I$. Therefore, matrices S and T are defined as $$S^{-1} = \text{diag}(A^H A) + \sigma^2 I \text{ and} \quad \text{Equation 21}$$

$$T = A^H A - \text{diag}(A^H A). \quad \text{Equation 22}$$

For a system that requires a decorrelator receiver, total system response matrix A which is assembled in the channel estimator processor 21, is assembled as a cross-correlation matrix ignoring the channel effects. The receiver structure is identical to the ZF-PIC-fI structure previously described, but uses the modified version of the A matrix.

As one skilled in this art realizes, other PIC receivers with full interference cancellation performed in the feedback loop (PIC-fI receivers) can be constructed using the system and method of the present invention 17 in conjunction with all existing linear receiver models. The two linear receiver models, ZF-BLE and MMSE, have been shown as exemplary embodiments. Using the method of the present invention 17, a linear receiver is first chosen determining convergence.

An alternative embodiment of the present invention 17 which uses the same system architecture 23 delegates the cancellation of inter-symbol interference or ISI to the direct interference canceller 39. The feedback interference processor 43 is used to cancel multi-access interference or MAI. This embodiment is referred to as a parallel interference canceller with direct ISI cancellation or PIC-dISI. As described in the referenced article by A. Reznik, this approach is more complex than the PIC-fI, but provides improved performance.

For a system that requires a zero-forcing mechanism, the receiver must converge to a ZF-BLE linear receiver. Using the system and method of the present invention 17, the receiver is referred to as a ZF-PIC-dISI receiver with its S and T matrices defined as $$S^{-1} = \begin{pmatrix} A^{(1)H}A^{(1)} & & & 0 \\ & \ddots & & \\ & & A^{(k)H}A^{(k)} & \\ & & & \ddots \\ 0 & & & & A^{(K)H}A^{(K)} \end{pmatrix} \text{ and}$$

Equation 23

$$T = A^H A - S^{-1}.$$

Equation 24

For a system that requires a minimum mean square error reception mechanism, the receiver must converge to an MMSE-BLE linear receiver. Using the system and method of the present invention 17, the receiver is referred to as an MMSE-PIC-dISI receiver with its S and T matrices defined as $$S^{-1} =$$

Equation 25

$$\begin{pmatrix} A^{(1)H}A^{(1)} & & & 0 \\ & \ddots & & \\ & & A^{(k)H}A^{(k)} & \\ & & & \ddots \\ 0 & & & & A^{(K)H}A^{(K)} \end{pmatrix} + \sigma^2 I \text{ and}$$

$$T = A^H A - S^{-1} + \sigma^2 I.$$

Equation 26

For a system that requires a decorrelator receiver, total system response matrix A which is assembled in the channel estimator processor 21, is assembled as a cross-correlation matrix ignoring the channel effects. The receiver structure is identical to the ZF-PIC-dISI structure previously described, but uses the modified version of the A matrix.

Other PIC receivers with direct ISI cancellation can be constructed using the system and method of the present invention 17 in conjunction with all existing linear receiver models. Two linear receivers, the ZF-BLE and MMSE-BLE, have been shown embodied in the PIC-dISI receiver structure. As in the PIC-fI receivers, a linear receiver is first chosen determining convergence.

The receivers described above converge well when the levels of interference are low. Multiple access systems such as the frequency division duplex or FDD mode of the proposed UMTS $3^{rd}$ generation Wideband CDMA standard with accurate power control exhibits low interference levels. As previously described, the present invention 17 is not limited to the receivers described. Any choice of matrices S and T may provide a viable receiver structure. Given an objective matrix O, Equation 16 defines any number of receiver structures that converge to a linear receiver defined by the objective matrix O. The different choices of S and T imply a different choice for the complexity and performance of a desired receiver. Better receiver 17 performance is obtained when exploiting the performance of the direct interference canceller 39 as in the case of the PIC-dISI receivers. However, delegating more effort to the direct interference canceller 39 requires computing the inverse of a more complicated matrix, thereby increasing the complexity of the receiver. This is seen by setting the matrix T to 0. The result is the prior art linear receiver model which has to invert the objective matrix O.

Figure 10:
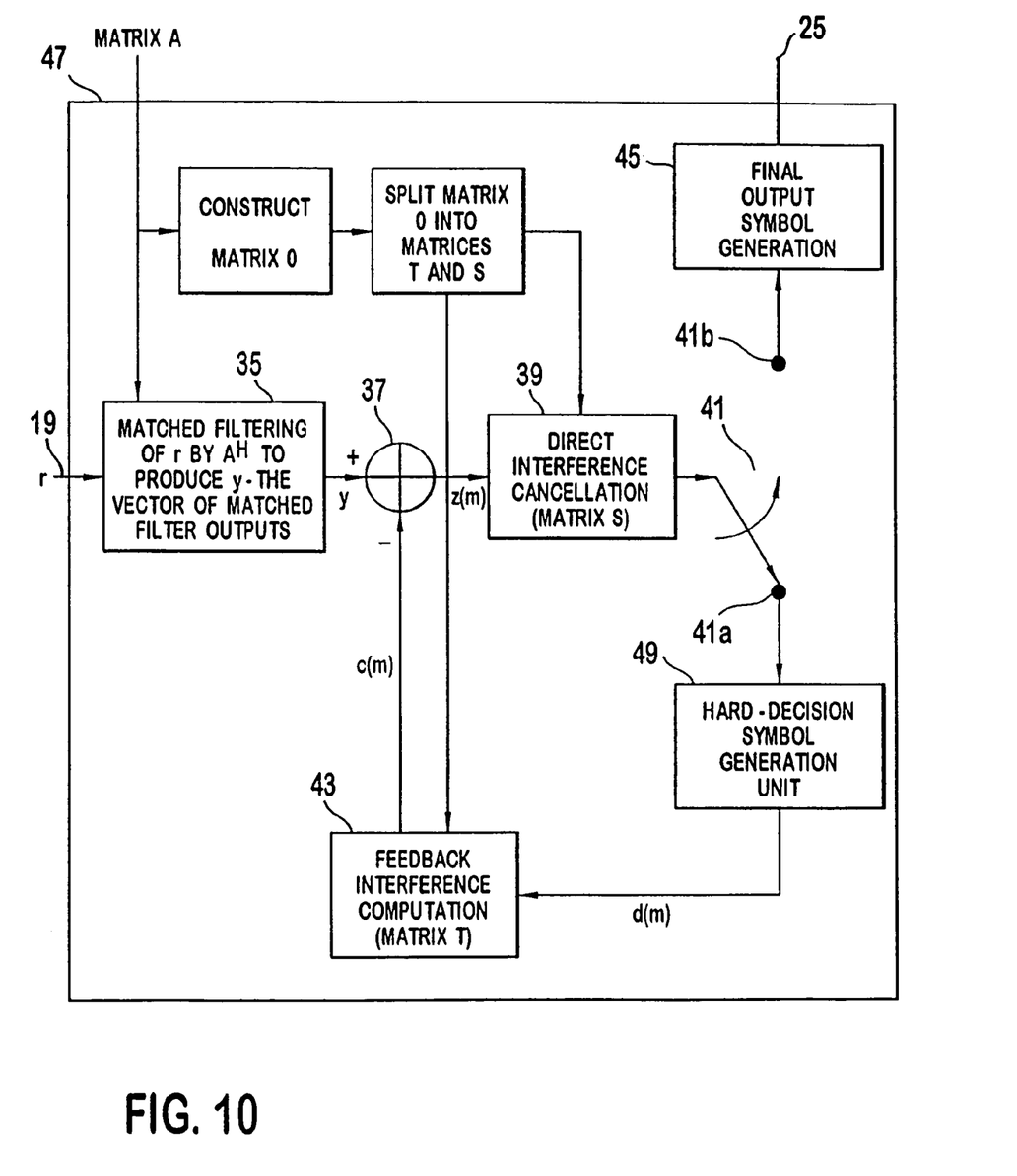
FIG. 10 is a system block diagram of a hard-decision PIC receiver of the present invention.
Figure 11:
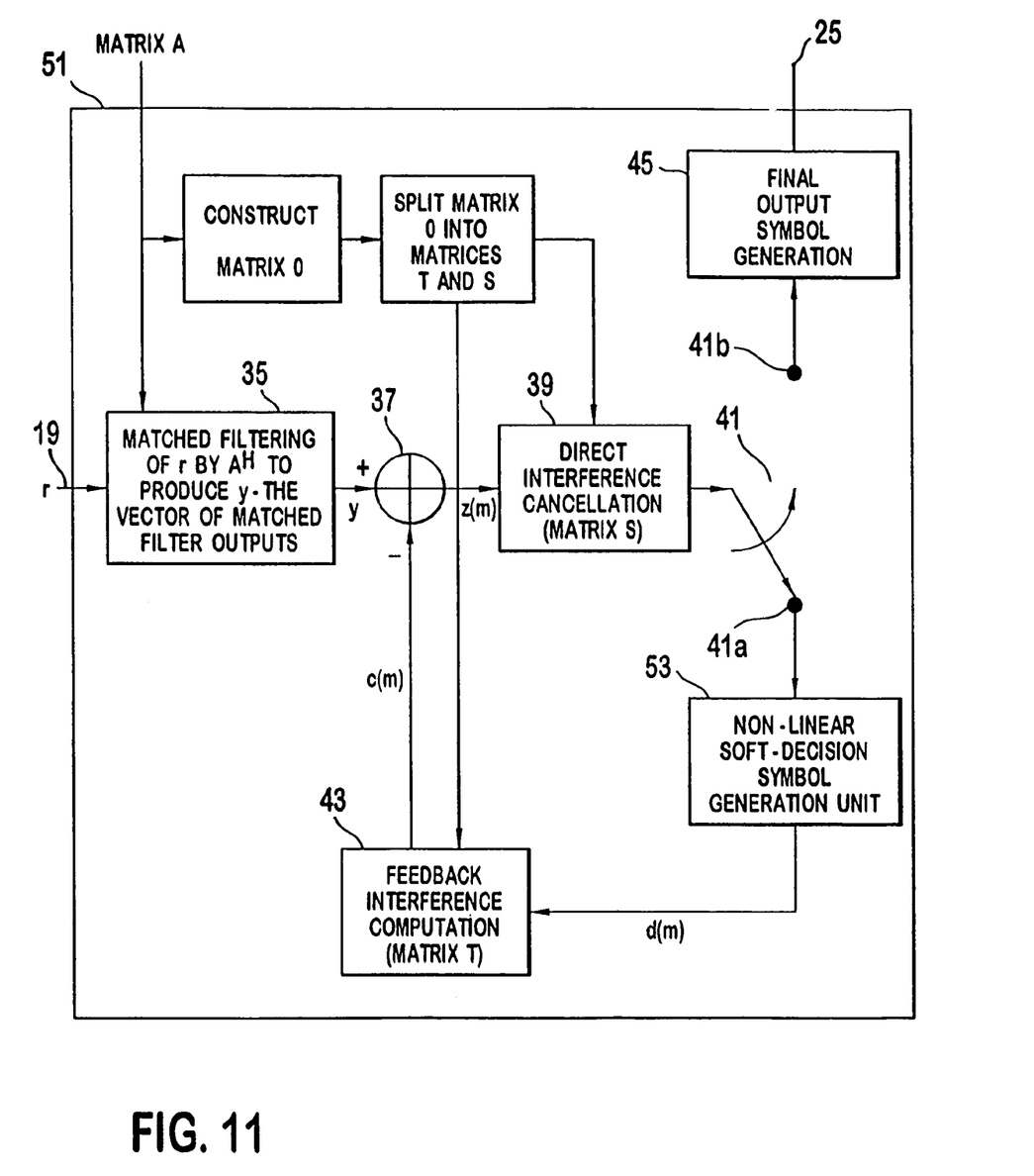
FIG. 11 is a system block diagram of a non-linear soft-decision PIC receiver of the present invention.

The above describes linear soft-decision parallel interference cancellation receivers. Hard-decision parallel interference cancellation receivers 47 are obtained by adding a symbol generator into the feedback path making hard decisions 49 on the symbol estimates d(m) as shown in FIG. 10. Non-linear soft-decision parallel interference cancellation receivers 51 can be obtained by replacing the hard symbol generator 49 with a non-linear soft-decision symbol generator 53 as shown in FIG. 11.

While the present invention has been described in terms of the preferred embodiments, other variations which are within the scope of the invention as outlined in the claims below will be apparent to those skilled in the art.

What is claimed is:

1. A method for receiving a plurality of communications transmitted in a wireless code division multiple access format, a channel response for each received communication is estimated, a system responsive matrix is constructed using codes and the channel responses of the received communications, an objective matrix is produced using the system response matrix, the received communications being matched filtered to produce a first input, the method comprising:
   a. processing the first input with an interference cancellation matrix to produce a first set of symbols of the received communications;
   b. processing the first set of produced symbols with a feedback interference construction matrix to produce feedback interference, the feedback matrix added to an inverse of the interference cancellation matrix equaling the objective matrix;
   c. subtracting the feedback interference from a result of the matched filtering to produce a next input; and
   d. processing the next input with the interference cancellation matrix to a next set of produced symbols of the received communications.

2. The method of claim 1 comprising iteratively repeating steps (b), (c) and (d) with the next set of produced symbols acting as the first set of produced symbols.

3. The method of claim 1 wherein the interference cancellation matrix is a diagonal of the objective matrix.

4. The method of claim 1 wherein the objective matrix is $A^H A$, where A is the system response matrix and $A^H$ is the Hermitian transpose of A.

5. The method of claim 1 wherein the objective matrix is $A^H A + \sigma^2 I$, where A is the system response matrix, $A^H$ is the Hermitian transpose of A, $\sigma^2$ is a noise variance and I is an identity matrix.

6. The method of claim 1 wherein the match filtering multiplies the received signals by a complex conjugate transpose of the system response matrix.

7. A receiver receives a plurality of communications, the communications are transmitted in a wireless code division multiple access format, a channel estimator estimates a channel response for each received communication, a system response matrix is constructed using codes and channel responses of the received communications, an objective matrix is produced using the system response matrix, a matched filter match filters the received communications, the receiver comprising:
   a direct interference canceller having an input configured to receive an output of the matched filter and an output of a subtractor and processing its input with an interference cancellation matrix;

a feedback interference computation block for processing an output of the direct interference canceller with a feedback construction matrix, the feedback matrix added to an inverse of the interference cancellation matrix equaling the objective matrix; and the subtractor for subtracting an output of the feedback interference computation block from an output of the matched filter.

8. The receiver of claim 7 wherein the output of the direct interference canceller produces soft symbols of the received communications.

9. The receiver of claim 8 comprising a hard-decision symbol generation unit receiving the output of the direct interference canceller and inputting hard symbols into the feedback interference computation block.

10. The receiver of claim 7 wherein the interference cancellation matrix being a diagonal of the objective matrix.

11. The receiver of claim 7 wherein the objective matrix is $A^H A$, where A is the system response matrix and $A^H$ is the Hermitian transpose of A.

12. The receiver of claim 7 wherein the objective matrix is $A^H A + \sigma^2 I$, where A is the system response matrix, $A^H$ is the Hermitian transpose of A, $\sigma^2$ is a noise variance and I is an identity matrix.

* * * * *